United States Patent
Mitsuda et al.

(10) Patent No.: US 8,143,824 B2
(45) Date of Patent: Mar. 27, 2012

(54) REGENERATING BRAKING SYSTEM INCLUDING SYNCHRONOUS MOTOR WITH FIELD EXCITATION AND CONTROL METHOD THEREOF

(75) Inventors: Kenrou Mitsuda, Tokyo (JP); Masaya Inoue, Tokyo (JP); Ikurou Suga, Tokyo (JP); Akihiro Daikoku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 497 days.

(21) Appl. No.: 12/478,278

(22) Filed: Jun. 4, 2009

(65) Prior Publication Data

US 2009/0302788 A1    Dec. 10, 2009

(30) Foreign Application Priority Data

Jun. 5, 2008    (JP) ................................. 2008-147946

(51) Int. Cl.
    *H02P 3/10*    (2006.01)
(52) U.S. Cl. .......................... 318/376; 318/377; 318/378
(58) Field of Classification Search ........... 318/376–378
    See application file for complete search history.

(56) References Cited

U.S. PATENT DOCUMENTS

| 3,988,599 | A | * | 10/1976 | Fleagle | 327/77 |
| 5,240,094 | A | * | 8/1993 | Suzuki | 192/220 |
| 5,302,009 | A | * | 4/1994 | Menard | 303/150 |
| 2008/0195291 | A1 | * | 8/2008 | Meaney et al. | 701/79 |

FOREIGN PATENT DOCUMENTS

| JP | 10-66399 | 3/1998 |
| JP | 2005-94922 | 4/2005 |
| JP | 2005-143157 | 6/2005 |
| JP | 2007-185082 | 7/2007 |

* cited by examiner

*Primary Examiner* — Thomas Dougherty
(74) *Attorney, Agent, or Firm* — Oblon, Spivak, McClelland, Maier & Neustadt, L.L.P.

(57) ABSTRACT

A regenerating braking system is provided, which includes: a synchronous motor with field coil excitation including a cylindrical stator coil, an inverter electrically connected to the stator coil, a battery electrically connected to the inverter, a rotor coil provided in an internal space of the stator coil, a two-way switch electrically connected to the rotor coil, and a capacitor electrically connected to the two-way switch; and a controller, wherein when the first differential calculus of acceleration of a load on the synchronous motor becomes negative, the controller stores regenerative power regenerated in the rotor coil from the stator coil, in the capacitor through the two-way switch, and wherein the controller supplies the regenerative power stored in the capacitor to the rotor coil through the two-way switch.

8 Claims, 10 Drawing Sheets

| | PM (PERMANENT MAGNET) MOTOR | SYNCHRONOUS MOTOR WITH FIELD COIL EXCITATION |
|---|---|---|
| TORQUE OCCURRENCE PRINCIPLE | ATTRACTION AND REPULSION OF STATOR COIL MAGNETIC FIELD AND ROTOR MAGNET | ATTRACTION AND REPULSION OF STATOR COIL MAGNETIC FIELD AND ROTOR COIL MAGNETIC FIELD |
| LARGE TORQUE AT LOW SPEED | ◎: BOTH STATOR AND ROTOR GENERATE SMALL HEAT | ×: HARD TO PRODUCE LARGE TORQUE AT LOW SPEED<br>△: ROTOR GENERATES HEAT |
| SIZE AND WEIGHT | ◎: LIGHTWEIGHT AND COMPACT<br>○: CONCENTRATION WINDING IS POSSIBLE AND MULTIPOLARIZATION IS EASY TO ACCOMPLISH | ×: DIFFICULT TO REDUCE WEIGHT BECAUSE OF MUCH IRON<br>×: FEEDING MEANS INTO ROTOR IS REQUIRED<br>○: CONCENTRATION WINDING IS POSSIBLE AND MULTIPOLARIZATION IS EASY TO ACCOMPLISH |
| HEAT RESISTANCE OF ROTOR | ×: MAGNET IS CONTAINED AND HEAT RESISTANCE IS LOW (150°C) | ◎: HEAT RESISTANCE IS HIGH |
| HIGH-SPEED LOW TORQUE REGION | ×: ELECTRO-MOTIVE FORCE IS LARGE, WEAK FIELD IS REQUIRED, AND IRON LOSS IS LARGE | ◎: ELECTRO-MOTIVE FORCE CAN BE CONTROLLED<br>◎: IRON LOSS IS SMALL |
| COST | ×: MAGNET MATERIAL COST IS LARGE | ◎: IRON AND COPPER ARE MAIN AND COST IS LOW |
| RECYCLABILITY | ×: MAGNETIC FORCE EXISTS AT ASSEMBLING TIME AND DISASSEMBLING TIME | ◎: NO MAGNETIC FIELD AT NON-ENERGIZING TIME |

| | ALUMINUM ELECTROLYTIC CAPACITOR | ELECTRIC DOUBLE LAYER CAPACITOR | LEAD STORAGE BATTERY | NICKEL HYDROGEN BATTERY | LITHIUM ION BATTERY |
|---|---|---|---|---|---|
| ELECTRODE MATERIAL | Al(Al$_2$O$_3$)Al | ACTIVATED CARBON/ACTIVATED CARBON | PbO$_2$/Pb | NiOOH/MH | LiCoO$_2$/(Li) |
| NUMBER OF CHARGE AND DISCHARGE CYCLES | 100,000 OR MORE | 100,000 (TO 3,000,000) | ABOUT 1000 (DEPENDING ON DEPTH) | 1000 OR MORE (DEPENDING ON DEPTH) | 1000 OR MORE (DEPENDING ON DEPTH) |
| OUTPUT DENSITY (EXPLOSIVE POWER) | 100,000W/kg | 3,700W/kg | 400W/kg | 750W/kg | 1,000W/kg |
| ENERGY DENSITY (SUSTAINING POWER) | 0.01 Wh/kg OR LESS | 7.5Wh/kg | 30Wh/kg | 45Wh/kg | 70Wh/kg |
| CELL VOLTAGE | 10~200V | 2.7V | 2.0V | 1.2V | 3.6V |
| STANDARD CHARGE AND DISCHARGE TIME | SEVERAL TENS OF MILLISECONDS | 20 SECONDS | ONE HOUR | SEVERAL TENS OF MINUTES | SEVERAL TENS OF MINUTES |

REGENERATING BRAKING SYSTEM INCLUDING SYNCHRONOUS MOTOR WITH FIELD EXCITATION AND CONTROL METHOD THEREOF

CROSS-REFERENCE TO RELATED APPLICATION

This application claims priority from Japanese Patent Application No. 2008-147946, filed on Jun. 5, 2008, the entire subject matter of which is incorporated herein by reference.

BACKGROUND OF THE INVENTION

1. Field of the Invention

This invention relates to a synchronous motor with field coil excitation equipped with a power-electronic interface for a regenerating braking system and a regenerating braking system including the same.

2. Description of the Related Art

As a synchronous motor with field coil excitation, an alternator of a lundell motor for regenerating a part of vehicle engine power and generating electricity is known and is used with almost all automobile vehicles. Recently, the alternator has been also used as a motor generator operating as a starter at the engine starting time. The synchronous motor with field coil excitation is widely used for a railway vehicle motor, an elevator motor, a servo motor, a large-scaled generator of a power plant, etc.

The efficiency of a motor reaches near 90% and steady efficiency improvement approaches the limit. In contrast, large regenerative power occurs at the motor decelerating time and if the power is not regenerated, the energy loss is 30% or more; it reaches 50% or more for a servo motor which is frequently started and stopped. Therefore, there is a demand for use of the power in power regeneration and power running using an electricity storage device.

Power regeneration technology at the decelerating time using a synchronous motor advances in an automobile including a battery as an electricity storage device. In an alternator of an automobile, a hybrid automobile, etc., regenerative power is recovered into a battery through an inverter from stator coil at the decelerating time.

JP-A-2005-143157 describes a motor controller for converting an alternating current (ac) into a direct current (dc) through an inverter from a stator coil, regenerating power in an electricity storage device, and supplying a field current to a rotor coil after adjusting a voltage with a DC/DC converter from the electricity storage device (see page 1 and FIG. 1).

JP-A-2005-94922 describes a power supply system for transmitting a part of electric power stored in a high-voltage battery from an engine and a motor from a rotor coil to a stator coil in a low-voltage generator with field coil excitation and charging a low-voltage battery to provide low-voltage electric power for driving auxiliaries, etc., of a vehicle (see page 1 and FIG. 1).

In the related-art motor controller described in JP-A-2005-143157, however, the regenerative braking efficiency of the field current supply of the rotor coil results from multiplying the efficiency of the inverter by the charge and discharge efficiency of the electricity storage device by the efficiency of the DC/DC converter, which inevitably results in low regenerative braking efficiency.

In the power supply system described in JP-A-2005-94922, when the rotor rotates or when the rotor stops, the rotor coil and the stator coil are assumed to be a transformer and the electric power is only transmitted from the rotor coil to the stator coil and it is impossible to even enhance the regenerative braking efficiency of the motor.

Further, in the related-art apparatus described above, there are a problem in that if an instantaneous regenerative braking current is allowed to flow into a battery, it cannot be stored as electric power because the current acceptance ratio of the battery is low and most of the instantaneous regenerative power is converted into heat, and a problem in that the life of the electricity storage device is shortened as the instantaneous regenerative braking current is allowed to flow into the battery. For example, for a lead storage battery, the current acceptance ratio is low and an instantaneous regenerative braking current becomes heat, overheating the lead storage battery and shortening the life of the battery. Additionally, to use a lithium ion battery, there is a problem in that if a regenerative braking current is accepted in a high charge state, the positive electrode becomes a high potential and remarkable degradation occurs. To prevent degradation, a method of bypassing only the instantaneous current and discarding it as heat with a resistor is available; however, the method leads to a high cost and also results in further lowering of the regenerative braking efficiency.

Thus, in the related-art regenerating braking system including the synchronous motor with field coil excitation, an alternating current is converted into a direct current through the inverter from the stator coil, power is regenerated in the electricity storage device, and a field current is supplied to the rotor coil after a voltage is adjusted with the DC/DC converter from the electricity storage device. Thus, the efficiency of the field current supply of the rotor coil results from multiplying the efficiency of the inverter by the charge and discharge efficiency of the electricity storage device by the efficiency of the DC/DC converter, which inevitably results in low motor efficiency and low regenerative braking efficiency. There is also a problem in that the life of the electricity storage device is shortened as the instantaneous regenerative braking current is allowed to flow into the electricity storage device.

SUMMARY OF THE INVENTION

The invention is embodied to solve the problems as described above and it is an object of the invention to enhance the regenerative braking efficiency of field current supply of a rotor coil. It is another object of the invention to decrease a regenerative braking current to a battery connected to a stator coil for increasing the life of the battery.

According to an aspect of the invention, there is provided a regenerating braking system comprising: a synchronous motor with field coil excitation comprising a cylindrical stator coil, an inverter electrically connected to the stator coil, a battery electrically connected to the inverter, a rotor coil provided in an internal space of the stator coil, a two-way switch electrically connected to the rotor coil, and a capacitor electrically connected to the two-way switch; and a controller electrically connected to the inverter, the two-way switch, and the capacitor. When the first differential calculus of acceleration of a load on the synchronous motor becomes negative, the controller stores regenerative power regenerated in the rotor coil from the stator coil, in the capacitor through the two-way switch. The controller supplies the regenerative power stored in the capacitor to the rotor coil through the two-way switch.

According to the above-described regenerating braking system, an instantaneous current that cannot be charged with the battery is regenerated for use as a field current of the rotor coil, whereby the efficiency of the motor can be enhanced and the regenerative braking efficiency can be enhanced. That is, electric power is directly regenerated in the capacitor for performing instantaneous charge and discharge through the two-way switch from the rotor coil not through the inverter or the battery and a field current is allowed to flow directly into the rotor coil from the capacitor through the two-way switch, whereby the regenerative braking efficiency of field current supply of the rotor coil can be enhanced and the total regenerative braking efficiency can also be enhanced. A part of instantaneous regenerative power is collected from the rotor coil rather than from the stator coil, so that the instantaneous regenerative power to the battery connected to the stator coil can be decreased for increasing the life of the battery.

The term "instantaneous" mentioned here is used to mean the time when the first differential calculus of acceleration of the load on the synchronous motor with field coil excitation becomes negative (for example, five seconds or less).

BRIEF DESCRIPTION OF THE DRAWINGS

Embodiments of the present invention will be described in detail based on the following figures, wherein.

DETAILED DESCRIPTION OF THE INVENTION

First Embodiment

Figure 1:
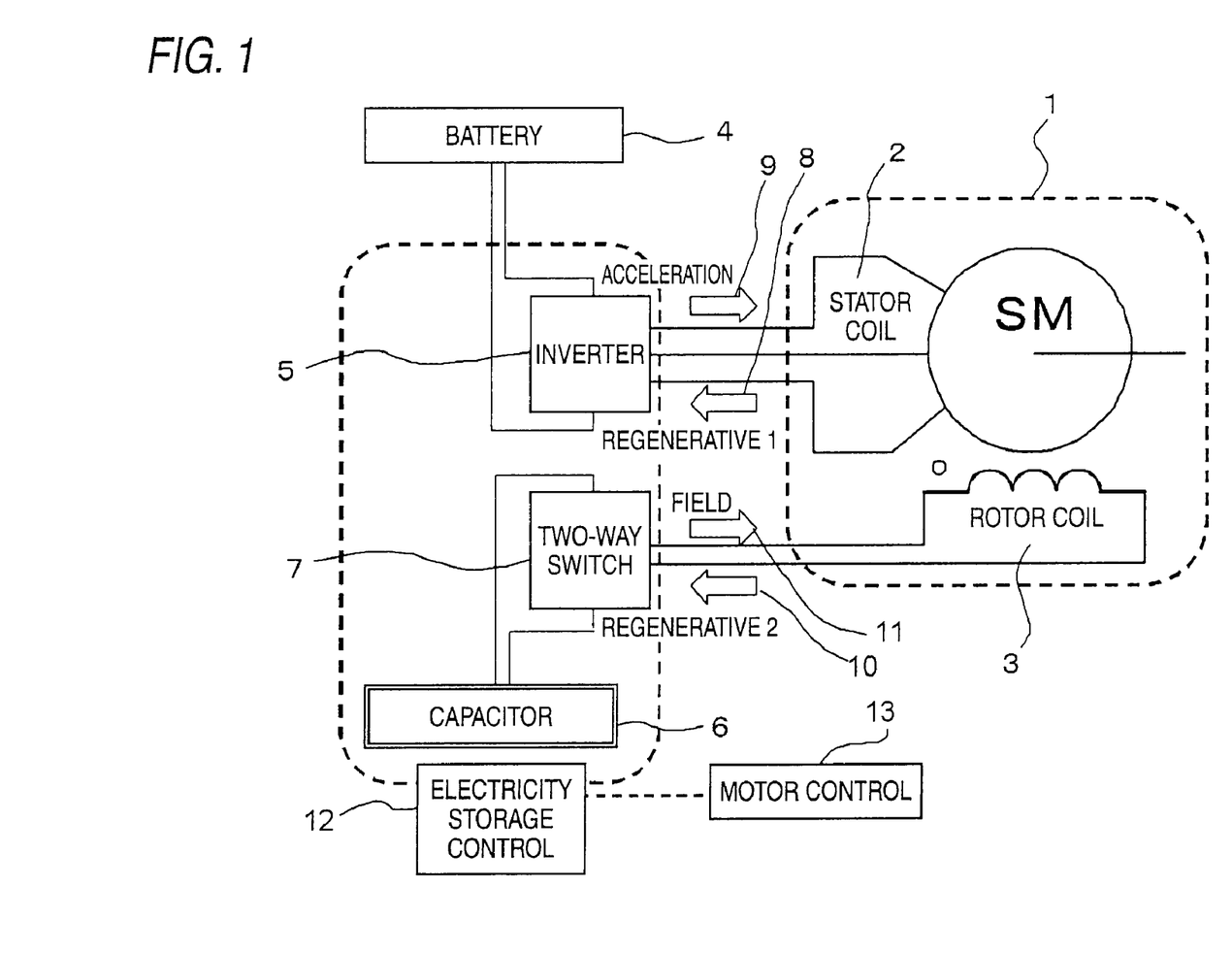
FIG. 1 is a block diagram of a regenerating braking system including a synchronous motor with field coil excitation according to a first embodiment of the invention.

FIG. 1 is a block diagram of a regenerating braking system including a synchronous motor with field coil excitation according to a first embodiment to carry out the invention. In FIG. 1, a synchronous motor with field coil excitation 1 has a rotor coil 3 provided in a cylindrical stator coil 2. An inverter 5 is connected to the stator coil 2 so as to transfer acceleration power and regenerative power. Further, a battery 4 is connected to the inverter 5. On the other hand, a two-way switch 7 is connected to the rotor coil 3 so as to transfer field power and regenerative power. Further, a capacitor 6 is connected to the two-way switch 7. As control means for controlling transfer of power, etc., an electricity storage controller 12 is connected to the inverter 5, the two-way switch 7, and the capacitor 6. A motor controller 13 is connected to the electricity storage controller 12.

Figure 2:
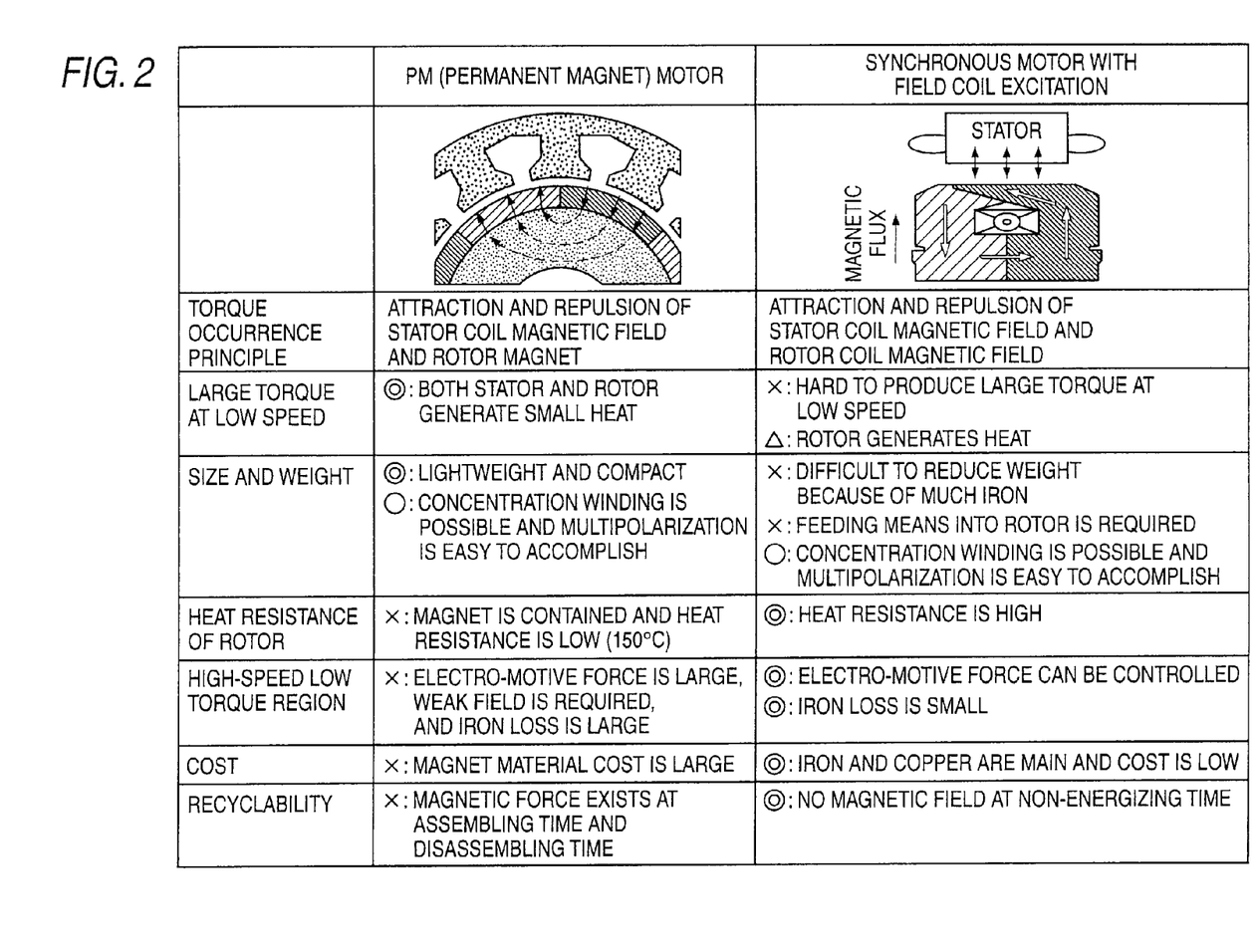
FIG. 2 is a characteristic drawing to make a comparison between the features of a permanent magnet synchronous motor and a related-art synchronous motor with field coil excitation.

FIG. 2 is a characteristic drawing to make a comparison between the features of a permanent magnet synchronous motor and a conventional synchronous motor with field coil excitation. The permanent magnet synchronous motor has the advantages that it is lightweight and compact, can provide a large toque at the low speed time, and also provides high motor efficiency as compared with the conventional synchronous motor with field coil excitation and is widely used as a motor of a hybrid automobile, etc. The permanent magnet synchronous motor is lightweight and compact and provides high motor efficiency because a rotor is made of a strong permanent magnet; rare earth of neodymium, diprocium, etc., is used. However, it is predicted that the rare earth price will rise in the future because of rareness of the rare earth and difficulty to obtain the rare earth. Additionally, the permanent magnet synchronous motor involves a problem in that a weak field is required and the iron loss increases because of the electromotive force produced by the magnet in a low heat resistant, high-speed low torque region, and a problem in that when the motor is disassembled, it cannot easily be disassembled because the strong magnet hinders the worker from disassembling the motor, etc. Expectations are placed on the synchronous motor with field coil excitation involving no permanent magnet. However, the synchronous motor with field coil excitation requires feeding means into the rotor coil and the motor efficiency is lowered because of electric power consumed by electric power consumed by the rotor coil. After electric power is once regenerated in the battery through the inverter from the stator coil, voltage is adjusted in the DC/DC converter and then current is allowed to flow into the rotor coil; the regenerative braking efficiency of electric power is also lowered.

In contrast, in the embodiment, drastic improvement in feeding means into the rotor coil as compared with the conventional synchronous motor with field coil excitation is expected as described below. The operation of the regenerating braking system according to the embodiment will be discussed with FIG. 1.

In the synchronous motor with field coil excitation 1, at the motor accelerating time, a direct current (dc) is converted into an alternating current (ac) through the inverter 5 from the battery 4 and acceleration power is supplied to the stator coil 2 and at the motor decelerating time, an alternating current (ac) is converted into a direct current (dc) through the inverter 5 from the stator coil 2 and regenerative power 8 is collected into the battery 4. At this time, when the first differential calculus of acceleration of the load on the synchronous motor with field coil excitation 1 becomes negative, the electricity storage controller 12 controls the two-way switch 7 to store regenerative power (regenerative power 2 in FIG. 1) instantaneously regenerated in the rotor coil 3 from the stator coil 2, in the capacitor 6 through the two-way switch 7. Since a part of the instantaneous regenerative power is thus collected into the capacitor 6, the regenerative braking current to the battery 4 can be decreased for increasing the life of the battery.

For the power regeneration in the capacitor 6, a second regenerative braking current 10 flows directly into the capacitor 6 through the two-way switch 7 from the rotor coil 3 and electric power is collected. When a torque occurs, a field current 11 flows into the rotor coil 3 directly through the two-way switch 7 from the capacitor 6. The efficiency of the two-way switch is near 100% and it can be expected that the charge and discharge efficiency of the capacitor 6 for performing instantaneous charge and discharge will be charge and discharge efficiency of 90% or more if an instantaneous electric double layer capacitor is used, for example. In the conventional motor, multiplying inverter efficiency 90%, standard charge and discharge efficiency of battery 80%, acceptance ratio of instantaneous current 30%, and efficiency of DC-DC converter 90% together (0.9×0.8×0.3×0.9) results in 0.2 and only 20% can be used. In contrast, in the embodiment, efficiency of 90% or more can be expected. Therefore, the total regenerative braking efficiency can also be improved drastically.

The simplest method of transmitting energy from the stator coil to the rotor coil may be a method of vibrating a current value in a d-axis direction, of stator coil current. The d-axis refers to a state at a relative position between the phase angle of stator coil current and rotor position when the center of the magnetic flux generated by the stator and the center of the magnetic flux of a rotor of a lundell motor match.

If the d-axis current fluctuates, the magnetic flux link to rotor also fluctuates because the rotor is joined from the stator by the total inductance. As the magnetic field fluctuates, an electromotive force occurs in the rotor coil and it is made possible to charge the capacitor as a kind of transformer. The case where only the d-axis current is fluctuated is the highest joint of the stator coil and rotor field coil and is efficient; the current applied to the stator coil from the inverter 5 may contain any other component than the d-axis current.

As a specific method of fluctuating the d-axis current, various methods are possible. For example, the following three methods can be used.

[First Method of Fluctuating the d-axis Current]

In the embodiment, control is performed so as to increase or decrease the d-axis current value of the current applied to the stator coil from the inverter 5 using a conventionally well known current vector control technique of a synchronous motor using rotor position information, etc. Specifically, the current applying phase of a travelling magnetic field synchronized with the rotor and the amplitude thereof is fluctuated. In this case, current components applied to the stator coil are all the d-axis current, so that the copper loss of the stator coil occurring when the capacitor 6 is charged is the minimum and the d-axis current can be fluctuated efficiently.

[Second Method of Fluctuating the d-axis Current]

An alternating current not synchronized with the rotation speed of the rotor coil 3 is applied. At this time, the current is applied to the stator coil 2 from the inverter 5 so as to become a travelling magnetic field in an opposite direction to the rotation direction of the rotor coil 3. In this case, the magnetic flux generated in the stator coil always becomes an asynchronous state to the rotor coil and thus the stator coil magnetic flux link to the rotor coil fluctuates and consequently the d-axis current fluctuates. In this case, speed information and position information of the rotor coil are not used, so that it is made possible to fluctuate the d-axis current without a special sensor or computation device.

[Third Method of Fluctuating the d-axis Current]

A direct current is applied to the stator coil 2. The DC current is applied to the stator coil 2 from the inverter 5. For example, the DC current is applied so as to always maintain a current value in a ratio U phase +1.0, V phase −0.5, and W phase −0.5. In this case, if the rotor coil rotates, the magnetic flux generated in the stator coil always becomes an asynchronous state to the rotor coil and thus the stator coil magnetic flux link to the rotor coil 3 fluctuates and consequently the d-axis current fluctuates. At the same time, the inverter 5 need not necessarily perform switching operation, so that control of the inverter 5 can be simplified and the switching loss can also be decreased.

Several circuits of the two-way switch 7 are considered; full-wave rectification using an H bridge rectifier circuit is the simplest and is at a low cost.

Figure 3:
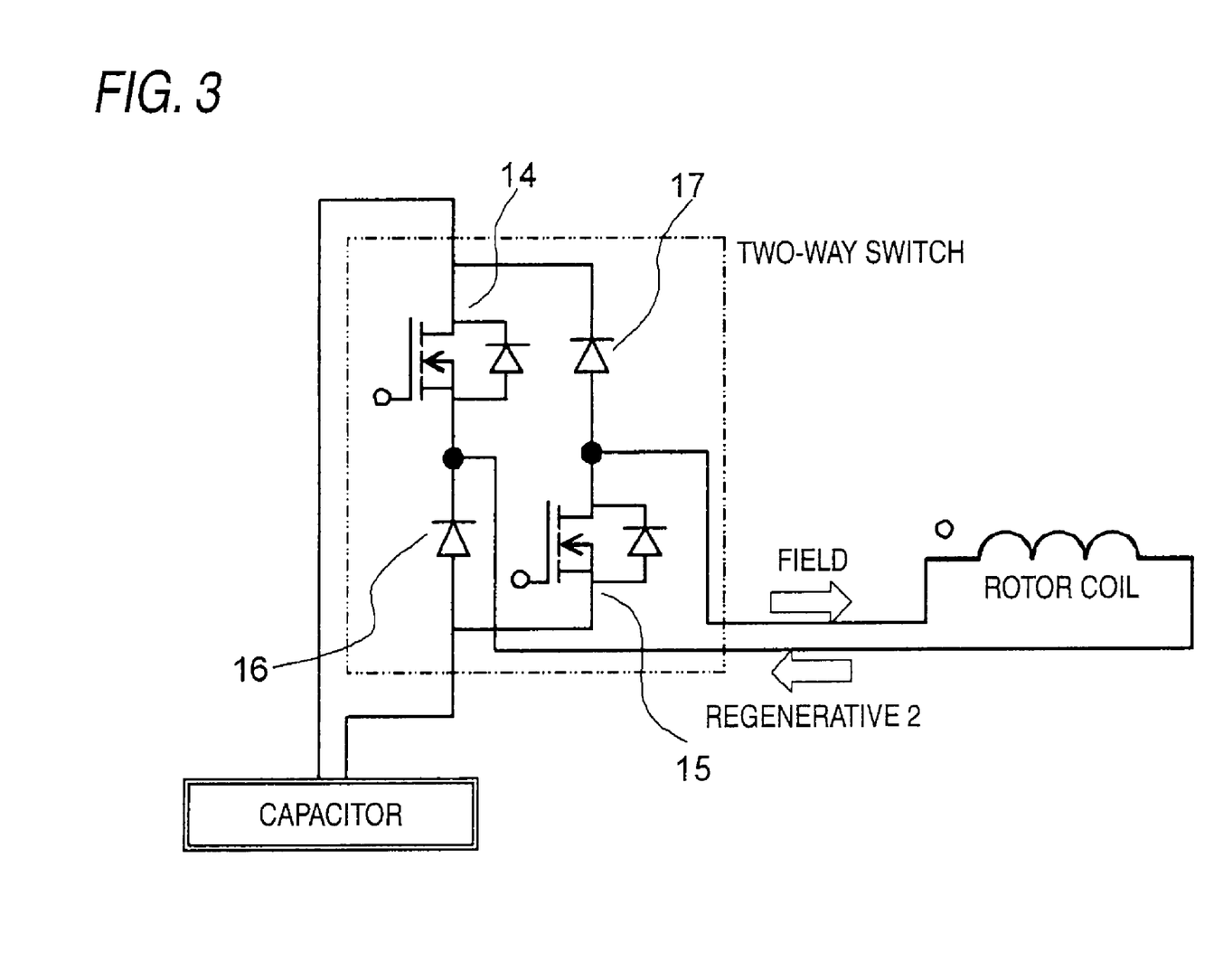
FIG. 3 shows a second electric circuit including an H bridge rectifier circuit used in the regenerating braking system according to the first embodiment of the invention.

FIG. 3 is a schematic drawing of the H bridge rectifier circuit used as the two-way switch. The H bridge rectifier circuit is implemented as a rectifier circuit having switching elements 14 and 15 including diodes antiparallel connected and diodes 16 and 17, the components being arranged as H form. The switching elements 14 and 15 are turned on/off, whereby the voltage of second regenerative power is adjusted, full-wave rectification is performed, and the capacitor can be charged. Conversely, the switching elements 14 and 15 are turned on/off, whereby field current is adjusted and the rotor coil can be energized. Since rectification is performed only with the switching elements and a reactor and a capacitor are not used, the time required for charging the capacitor is extremely short. Whether to charge the capacitor by the second regenerative power or supply field current to the rotor coil from the capacitor is determined under the control of the electricity storage controller 12 cooperating with the motor controller 13. Specifically, when the motor is decelerated and regeneration is performed, the H bridge rectifier circuit is controlled so as to charge the capacitor by the second regenerative power; to accelerate the motor, the H bridge rectifier circuit is controlled so as to supply field current to the rotor coil from the capacitor. The energy loss in the H bridge rectifier circuit scarcely exists and energy can be transferred between the capacitor and the rotor coil in efficiency of near 100%.

Figure 4:
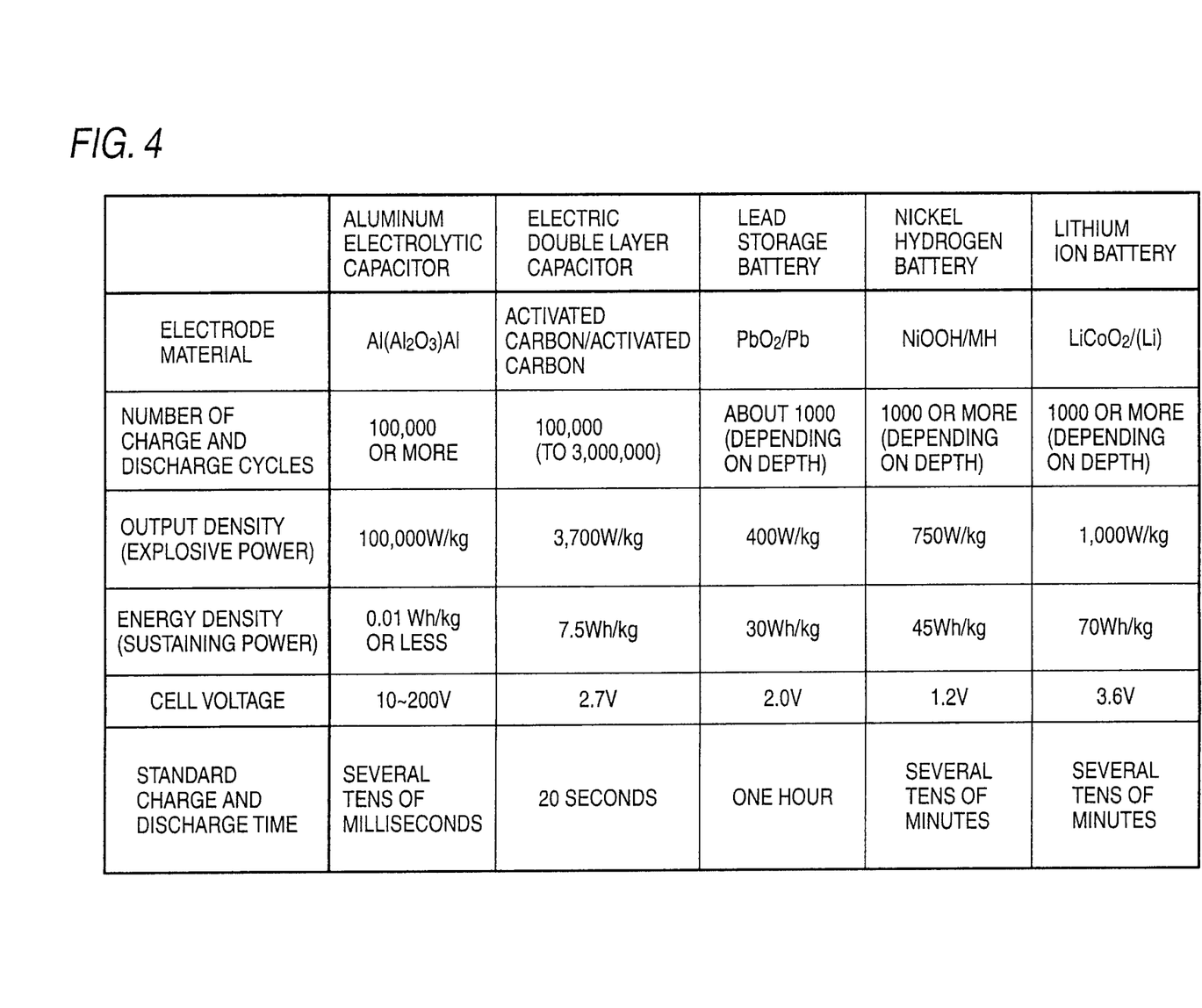
FIG. 4 is a characteristic drawing of various electric power storage devices according to the first embodiment of the invention.

FIG. 4 is a characteristic drawing to compare the features of various electric power storage devices. A capacitor is an electric power storage device that can be charged and discharged in an instant. The capacitor defined here is an electric double layer capacitor (also called electric double layer condenser or EDLC), but may be a lithium ion capacitor, etc., if it has quick response capability. An aluminum electrolytic capacitor can be charged and discharged in an instant, but the energy amount that can be stored is extremely small. It is difficult to charge and discharge a battery such as a lead storage battery in an instant; if charge is accepted, most changes to heat and power cannot effectively be used as regenerative power. Since charge and discharge are performed each time the motor is accelerated and decelerated, there is a demand for an electric power storage device having an excellent cycle life of charge and discharge. Most desirable may be the electric double layer capacitor. However, the time required for charging and discharging a general electric double layer capacitor which is commercially available is comparatively long as 20 seconds.

Therefore, an electric double layer capacitor having low normalized internal resistance is desirable as described later.

Figure 5:
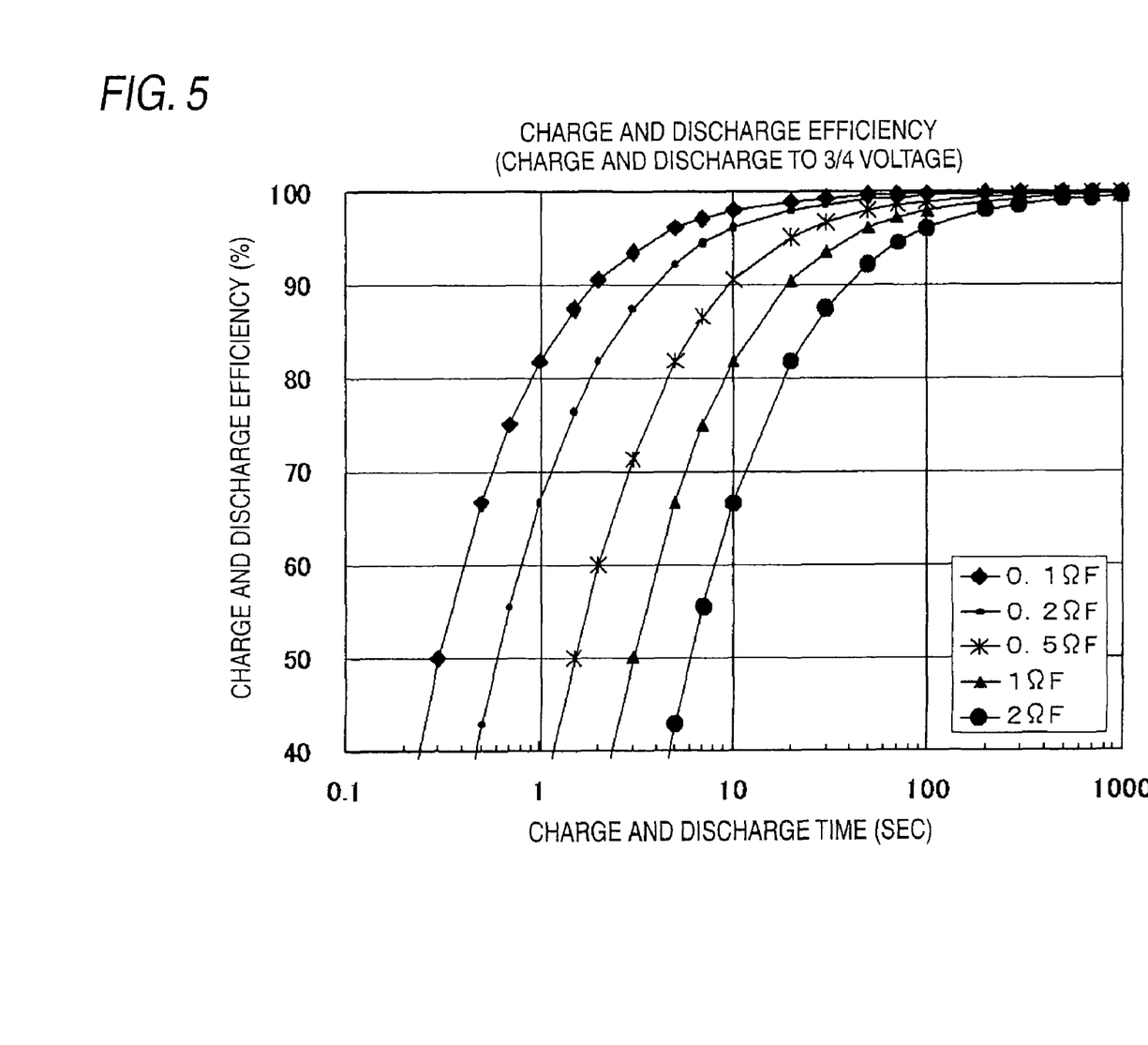
FIG. 5 is a characteristic drawing to show the relationship among charge and discharge time and charge and discharge efficiency and normalized internal resistance (ΩF value) according to the first embodiment of the invention.

FIG. 5 is a characteristic drawing to show the relationship among charge and discharge time and charge and discharge efficiency and normalized internal resistance (ΩF value) in the electric double layer capacitor. If the normalized internal resistance (ΩF value) is 0.1 ΩF, the charge and discharge efficiency when 0.5-sec charge is performed is 90% and the charge and discharge efficiency when 0.5-sec discharge is performed is 90% and thus 1-sec charge and discharge efficiency becomes 81%.

The normalized internal resistance (ohm farad value) corresponding to a time constant of a usual electric double layer capacitor which is commercially available is about 2.0 ΩF; to use the capacitor, as charge and discharge are performed on a period of 20 sec, the charge and discharge efficiency becomes about 80%. To provide the charge and discharge efficiency 90% or more in a charge and discharge cycle of several seconds, a capacitor having normalized internal resistance of 0.5 ΩF or less may be desirable.

Figure 6:
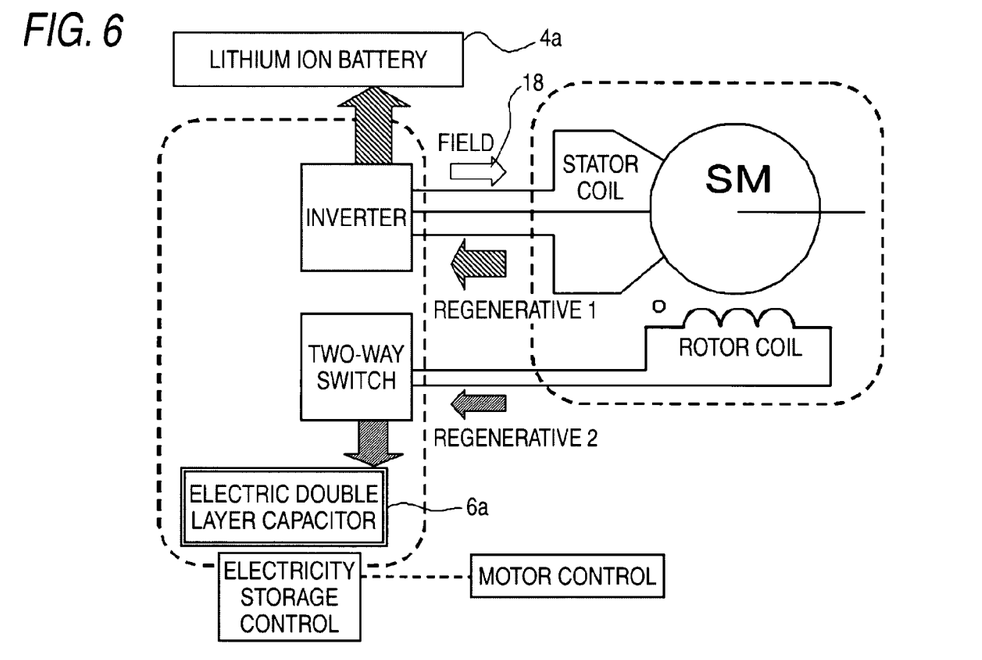
FIG. 6 is a schematic representation of the regenerating braking system at the motor decelerating time according to the first embodiment of the invention.
Figure 7:
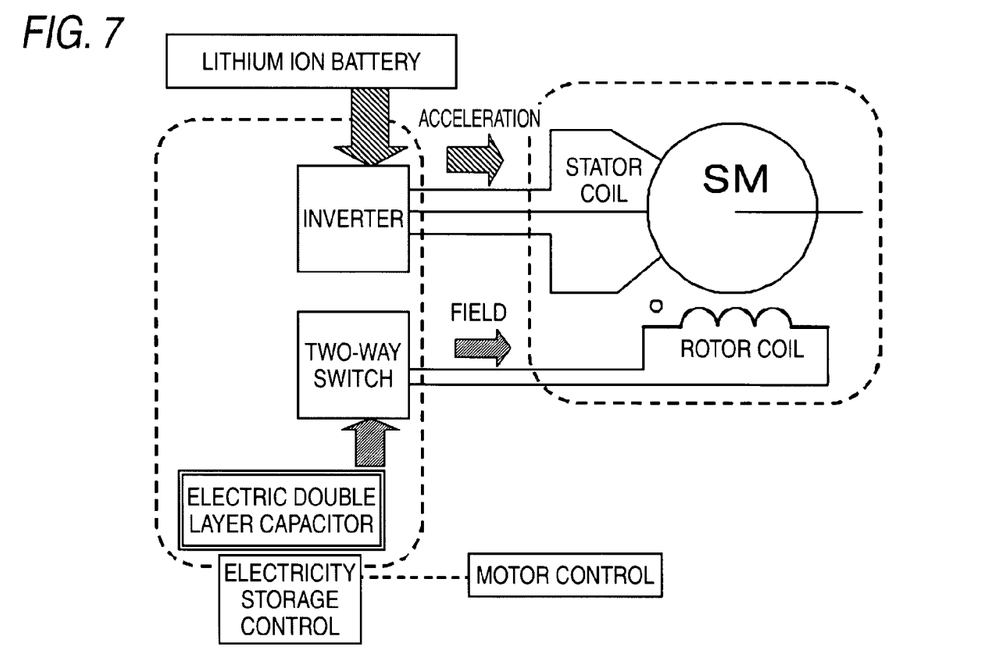
FIG. 7 is a schematic representation of the regenerating braking system at the motor accelerating time according to the first embodiment of the invention.

FIGS. 6 and 7 are schematic representations of the regenerating braking system using a total 144 V lithium ion battery module as a battery and using a total 30 to 50 V electric double layer capacitor module as a capacitor. The total 144 V lithium ion battery module includes 36 lithium ion batteries connected in series, and the total 30-to-50-V electric double layer capacitor module is made up of 20 electric double layer capacitors connected in series. A 0.3-ΩF capacitor is used as the electric double layer capacitor. Arrows indicate the directions of regenerative braking current and field current of the inverter 5 and the two-way switch 7 and indicate input/output of electric power to/from a lithium ion battery 4a used as the battery and an electric double layer capacitor 6a used as the capacitor. The stator coil is three-phase star connection. A synchronous motor with field coil excitation of a lundell motor is used as the motor. A slip ring and a brush are attached to the rotor.

FIG. 6 shows the operation when the motor is decelerated. A regenerative braking current flows from the stator coil 2 through the inverter 5 into the lithium ion battery 4a and second regenerative power is transmitted to the rotor coil 3 by a field current for changing the d-axis current allowed to flow into the stator coil 2 and is supplied to the electric double layer capacitor 6a through the two-way switch 7 (H bridge rectifier circuit) for charging the capacitor.

FIG. 7 shows the operation when the motor is accelerated. A field current is allowed to flow into the rotor coil 3 through the two-way switch 7 from the electric double layer capacitor 6a and rotation torque can be increased. The regenerating braking system according to the embodiment may be suitable, for example, to a motor/generator system for an automobile, which includes a starter of an engine of an automobile intended for improvement of fuel efficiency by idle stop, an alternator for regenerating electric power from the engine and storing the electric power in the battery, and an electric motor requiring a large torque for a short time. It is not necessary to allow a field current to flow to the rotor at all times and a large field current is required for the rotor for an extremely short time in restarting the engine and thus the energy capacitance of the capacitor may be small.

Figure 8:
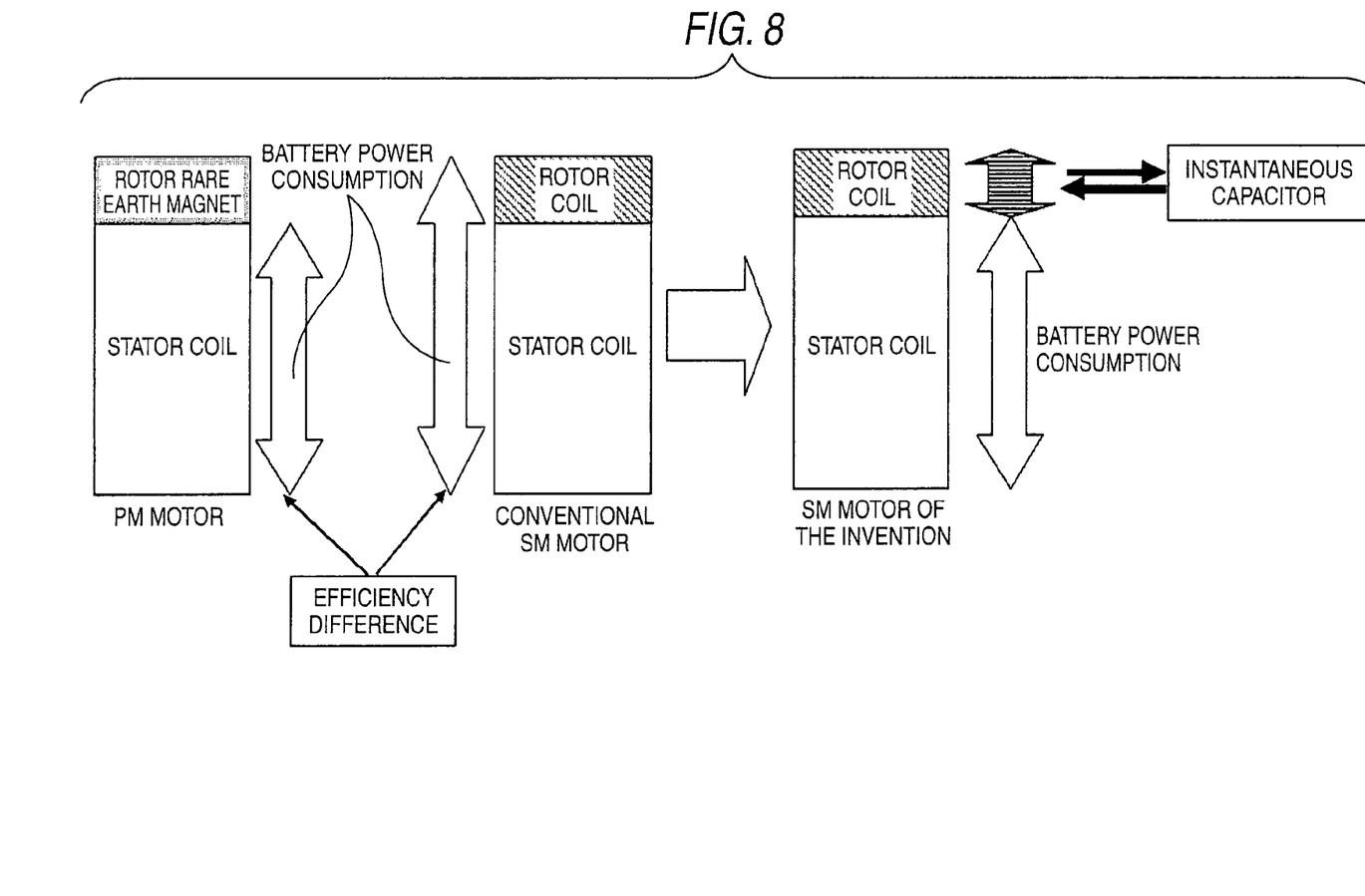
FIG. 8 is a characteristic drawing to compare efficiencies of a conventional permanent magnet synchronous motor, a conventional synchronous motor with field coil excitation, and a synchronous motor with field coil excitation according to the first embodiment of the invention.

FIG. 8 is a schematic representation to compare motor efficiencies of a conventional permanent magnet synchronous motor (PM motor), a conventional synchronous motor with field coil excitation, and the synchronous motor with field coil excitation of the embodiment (SM motor). In the conventional permanent magnet synchronous motor (PM motor), electric power need not be supplied to a rotor coil and thus battery power consumption may be smaller than that in the conventional synchronous motor with field coil excitation (SM motor), and the motor efficiency increases. In contrast, in the embodiment, electric power that cannot be collected in the battery is used for the current allowed to flow into the rotor coil, so that the motor efficiency can be pulled up to that about the same as the conventional permanent magnet synchronous motor. The disadvantage of the synchronous motor with field coil excitation shown in FIG. 2 in that it is hard to produce a large torque in low-speed rotation can be eliminated by supplying a large field current in an instant from the capacitor.

That is, according to the embodiment, a part of instantaneous regenerative power rapidly occurring when the motor is decelerated, particularly when the first differential calculus of acceleration of the load on the motor becomes negative can be stored in the capacitor highly efficiently through the rotor coil and can be used as field current of the rotor coil when the motor is accelerated. That is, it is made possible to perform power regeneration and reuse in an instant and highly efficiently.

Therefore, a steep regenerative braking current does not flow into the battery through the inverter from the stator coil. A steep regenerative braking current does not flow into the battery, whereby the life of the battery can be increased. The main cause of degradation of the used battery is quick recharge. To use a lithium ion battery as the battery, quick recharge in a state close to a full charge state causes fatal damage and the battery is degraded rapidly. Therefore, in the embodiment using the lithium ion battery as the battery, the battery life prolonging effect of the invention is remarkably exerted and the battery life about 1.5 times the conventional battery life can be provided.

Second Embodiment

Figure 9:
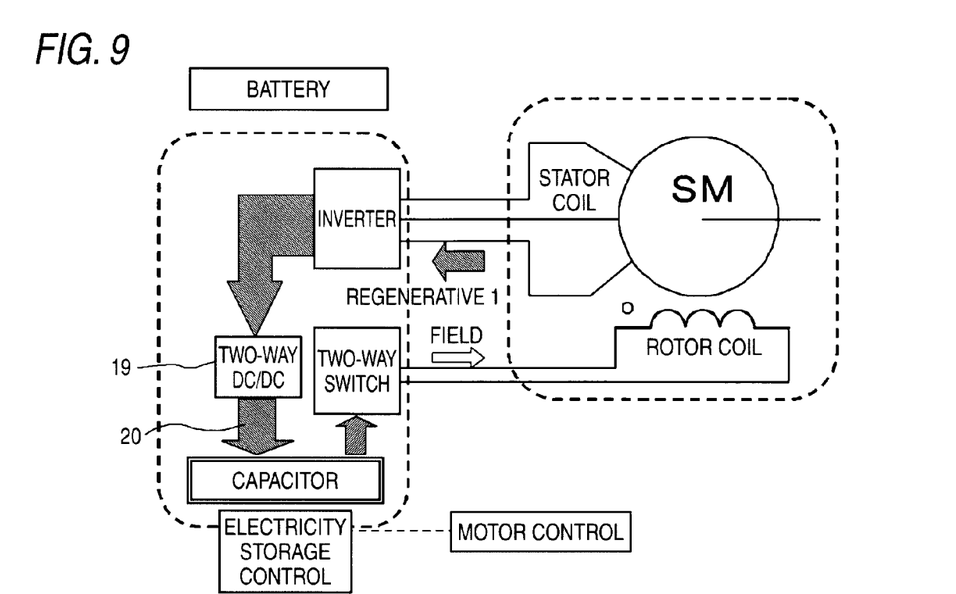
FIG. 9 is a schematic representation of a regenerating braking system including a synchronous motor with field excitation at the motor decelerating time according to a second embodiment of the invention.
Figure 10:
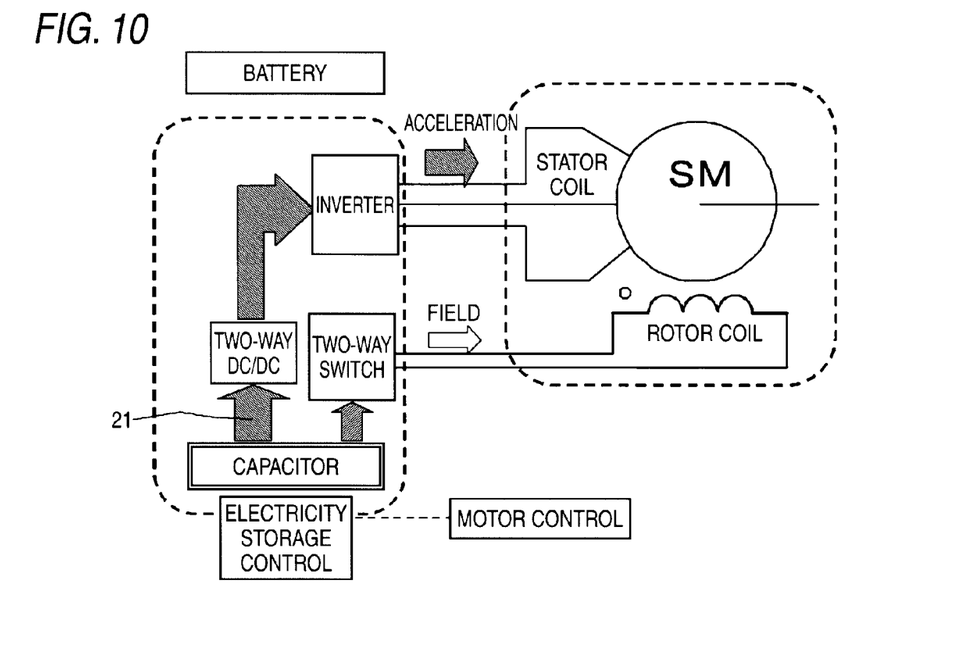
FIG. 10 is a schematic representation of the regenerating braking system at the motor accelerating time according to the second embodiment of the invention.

FIGS. 9 and 10 are schematic representations of a regenerating braking system including a synchronous motor with field excitation according to a second embodiment to carry out the invention. The regenerating braking system according to the second embodiment further has a two-way DC/DC converter 19 between an inverter 5 and a capacitor 6 in addition to the configuration of the first embodiment. The arrows in the figures indicate the directions of regenerative braking current and field current and input/output of electric power as in the first embodiment.

In the above-described regenerating braking system, when a motor is decelerated, control is performed so as to store a part of steep regenerative power in a second electricity storage device through the inverter and the two-way DC/DC converter 19. When the motor is accelerated, control is performed so as to supply acceleration power to a stator coil through the two-way DC/DC converter 19 and the inverter.

FIG. 9 shows the operation when the motor is decelerated. On the other hand, FIG. 10 shows the operation when the motor is accelerated. As the operation is performed through the inverter and the two-way DC/DC converter 19, the charge and discharge efficiency worsens accordingly as compared with the case where only the two-way switch and the capacitor are involved. However, if the charge and discharge efficiency of the capacity for steep charge and discharge is sufficiently higher than the charge and discharge efficiency of the battery, the total energy regenerative braking efficiency also increases.

In the second embodiment, in addition to second power regeneration from a rotor coil, first power regeneration from the stator coil can be performed for the capacitor, so that rapid charge of the battery can be more decreased than that in the first embodiment and the battery life performance can be further enhanced.

Not only supply of a field current to the rotor coil, but also supply of acceleration power to the stator coil can be executed from the capacitor, so that it is made possible to increase a rapid rotation torque.

Further, if supply of a field current to the rotor coil is insufficient according to the charge state of the capacitor, it is made possible to charge the capacitor from the stator coil for preparation for accelerating the motor. That is, it is made possible to optimally control the charge state of the capacitor not only by electric power storage from the rotor coil, but also by electric power storage from the stator coil. Not only discharge from the capacitor to the rotor coil, but also supply of electric power from the capacitor to the stator coil are made possible, whereby excessive charge of the capacitor as regeneration is repeated can be prevented for keeping optimum the charge state of the capacitor.

Third Embodiment

Figure 11:
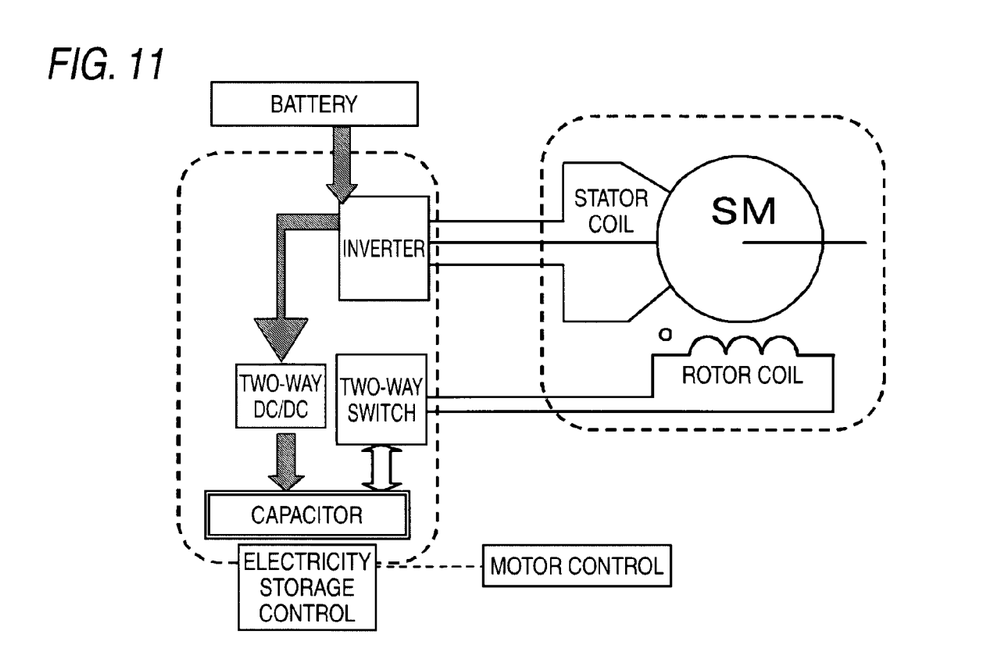
FIG. 11 is a schematic representation of a regenerating braking system when electric power is transferred from a battery to a capacitor according to a third embodiment of the invention.
Figure 12:
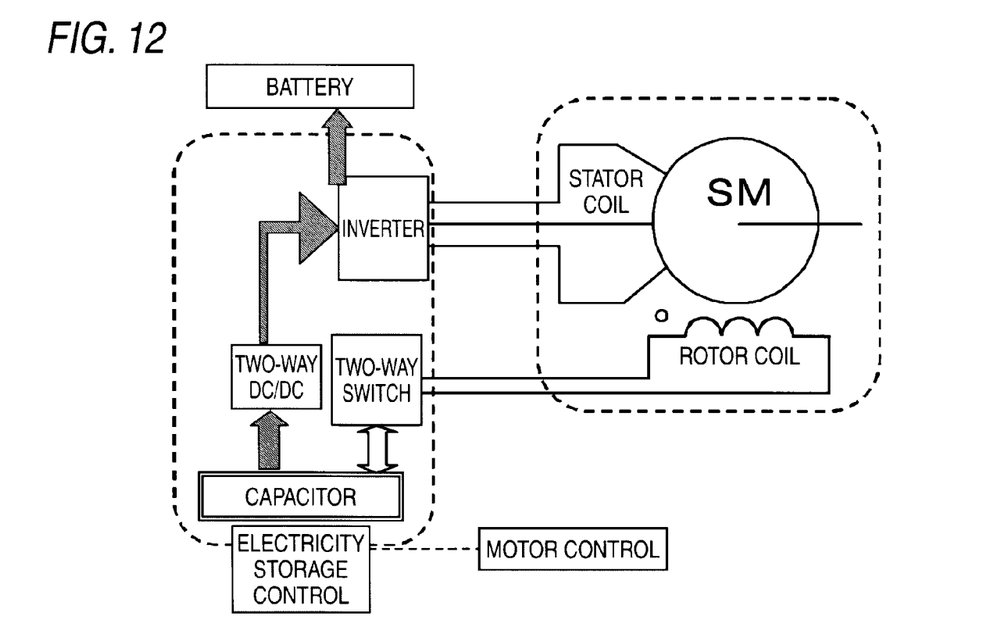
FIG. 12 is a schematic representation of the regenerating braking system when electric power is transferred from the capacitor to the battery according to the third embodiment of the invention.

FIGS. 11 and 12 are schematic representations of a regenerating braking system including a synchronous motor with field excitation according to a third embodiment to carry out the invention. The regenerating braking system according to the third embodiment has a similar configuration to that of the second embodiment, but they differ in control method.

In the third embodiment, control is performed so as to transfer electric power from a battery to a capacitor through a two-way DC/DC converter if charge of the capacitor is insufficient (FIG. 11) regardless of whether a motor is accelerated or decelerated. Conversely, if charge of the capacitor is excessive (FIG. 12), control is performed so as to transfer electric power from the capacitor to the battery through the two-way DC/DC converter. Electric power can be transferred between the capacitor and the battery through the two-way DC/DC converter not through an inverter although the circuitry is connected to the inverter.

The embodiment has the advantage that if the charge state of the capacitor is excessively discharge or is excessively charge, the charge state can be promptly restored to the optimum charge state. The third embodiment is particularly effective if the motor is frequently accelerated and decelerated and it is feared that the charge state of the capacitor will be gradually placed out of the ideal charge state. The ideal charge state of the capacitor is a state in which assumed charge and discharge are both possible; as for an electric double layer capacitor, the ideal charge state is a charge state in which the voltage becomes a voltage in the vicinity of ¾ of the rated voltage. In the first embodiment, control is performed so that if charge of the capacitor becomes excessive, more charge is not accepted and control is performed so that if discharge of the capacitor, namely, supply of electric power from the capacitor becomes excessive, more discharge is not executed. Of course, if the energy amount that can be stored in the capacitor is sufficiently high, it is allowable. However, if the charge state of the capacitor can be controlled regardless of whether the motor is accelerated or decelerated as in the third embodiment, it is made possible to reduce the energy amount that can be stored in the capacitor to the minimum necessary amount, make the capacitor lightweight and compact, and reduce the cost of the capacitor.

Fourth Embodiment

Figure 13:
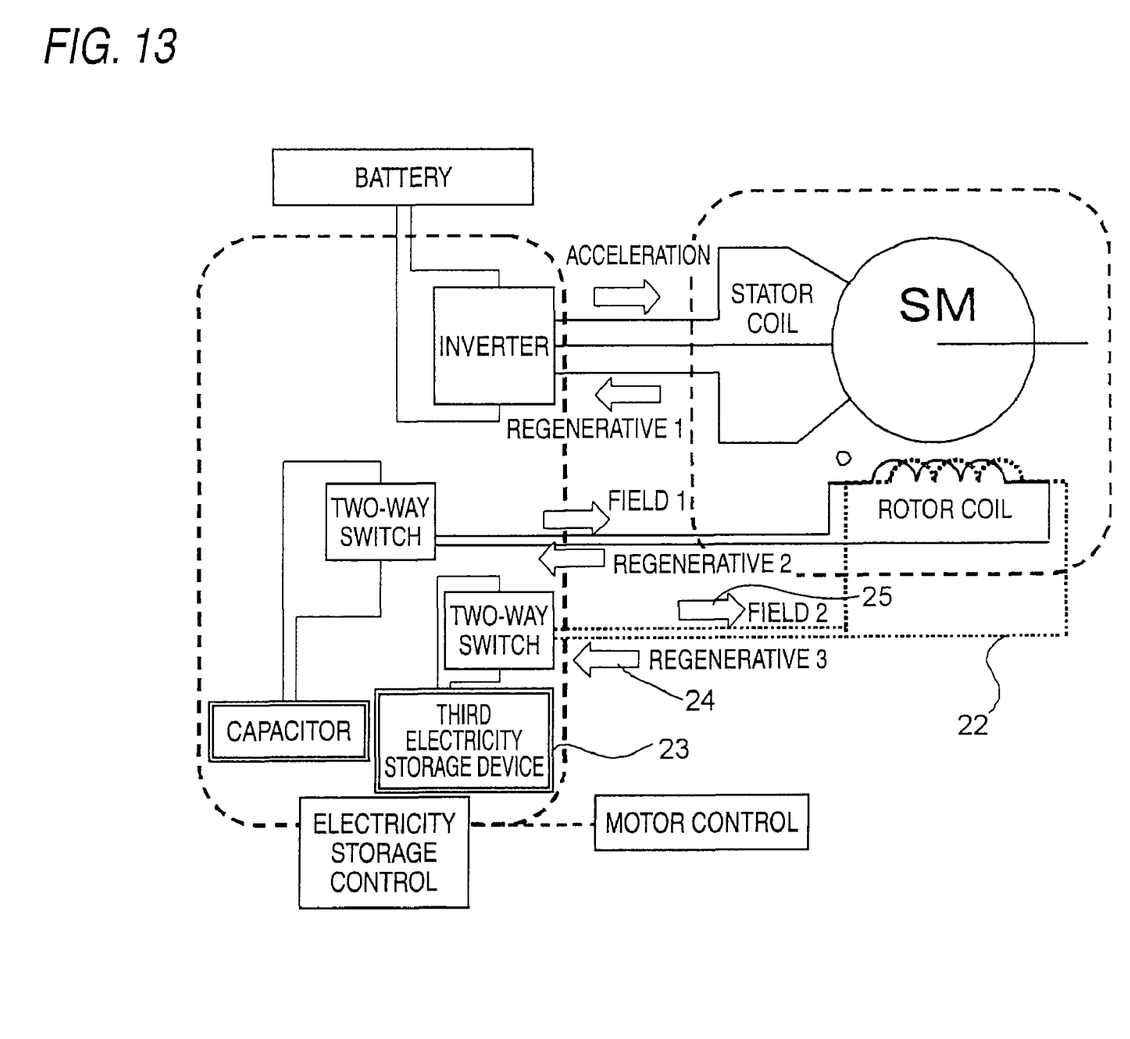
FIG. 13 is a schematic drawing of a regenerating braking system including a synchronous motor with field excitation according to a fourth embodiment of the invention.

FIG. 13 is a schematic drawing of a regenerating braking system including a synchronous motor with field coil excitation according to a fourth embodiment to carry out the invention. In the embodiment, as rotor coils, a second rotor coil 22 is provided in addition to a first rotor coil and is connected through a third electric circuit to a third electricity storage device 23 through a two-way switch.

The regenerating braking system according to the fourth embodiment is suitable for a motor which is always rotated and frequently accelerated and decelerated. A continuous field current is supplied to the second rotor coil 22 using the third electricity storage device, and a field current of steep acceleration is allowed to flow into a first rotor coil from a capacitor. A slip ring and a brush become necessary for the first rotor coil and the second rotor coil 22, but a field current of a given voltage is allowed to flow into the second rotor coil at all times from the third electric power storage device and control of stationary rotation of the motor can be performed stably over a long time. It is desirable that the line of the first rotor coil should be made thicker than that of the second rotor coil. The loss of the first rotor coil can be lessened and a large field current can be allowed to flow. The third electric power storage device may be a battery like a lead storage battery. The battery may also serve as the third electric power storage device and the system can be simplified.

In the first embodiment, the operation in the case where the voltage of the capacitor is lower than that of the battery has been described. However, the voltage of the capacitor may be higher than that of the battery and a field current can be allowed to flow at a large voltage in low-speed rotation. Thus, the advantages that it becomes easy to provide a large torque, that the electric wire of the rotor coil can be thinned for weight reduction, and the like can be provided.

In the above-described embodiments, the case where a three-phase alternating current coil is used as the stator coil has been described. However, the number of phases may be increased like a six-phase alternating current coil. Coil connection may be star connection or may be delta connection; the d-axis current can be easily fluctuated as in the embodiments of the invention.

What is claimed is:

1. A regenerating braking system comprising:
a synchronous motor with field coil excitation comprising
a cylindrical stator coil,
an inverter electrically connected to the stator coil,
a battery electrically connected to the inverter,
a rotor coil provided in an internal space of the stator coil,
a two-way switch electrically connected to the rotor coil, and
a capacitor electrically connected to the two-way switch; and
a controller electrically connected to the inverter, the two-way switch, and the capacitor,
wherein when the first differential calculus of acceleration of a load on the synchronous motor becomes negative, the controller stores regenerative power regenerated in the rotor coil from the stator coil, in the capacitor through the two-way switch, and
wherein the controller supplies the regenerative power stored in the capacitor to the rotor coil through the two-way switch.

2. The regenerating braking system according to claim 1, further comprising a two-way DC/DC converter between the inverter and the capacitor, the two-way DC/DC converter being electrically connected to the controller,
wherein when the first differential calculus of the acceleration of the load on the synchronous motor becomes negative, the controller stores regenerative power regenerated in the inverter from the stator coil, in the capacitor through the two-way DC/DC converter, and wherein the controller supplies the regenerative power stored in the capacitor to the stator coil through the two-way DC/DC converter and the inverter.

3. The regenerating braking system according to claim 2, wherein electric power is transferred between the battery and the capacitor through the inverter and the two-way DC/DC converter.

4. The regenerating braking system according to claim 1, further comprising:
- a second rotor coil provided in the internal space of the stator coil;
- a second two-way switch electrically connected to the second rotor coil; and
- an electricity storage device electrically connected to the second two-way switch,
- wherein the second two-way switch and the electricity storage device are electrically connected to the controller,
- wherein when the first differential calculus of the acceleration of the load on the synchronous motor becomes negative, the controller stores regenerative power regenerated in the second rotor coil from the stator coil, in the electricity storage device through the second two-way switch, and
- wherein the controller supplies the regenerative power stored in the electricity storage device to the second rotor coil through the second two-way switch.

5. The regenerating braking system according to claim 1, wherein when a fluctuating d-axis current flows into the stator coil, the controller stores regenerative power regenerated in the rotor coil from the stator coil by an induced electromotive force occurring in the rotor coil, in the capacitor through the two-way switch.

6. The regenerating braking system according to claim 5, wherein the controller controls the inverter so that, in a state in which the rotor coil rotates, a current flowing into the stator coil is held in a direct current and the d-axis current is generated.

7. The regenerating braking system according to claim 1, wherein the two-way switch includes an H bridge rectifier circuit of full-wave rectification.

8. A control method of a regenerating braking system, the regenerating braking system comprising: the synchronous motor with field coil excitation comprising a cylindrical stator coil, an inverter electrically connected to the stator coil, a battery electrically connected to the inverter, a rotor coil provided in an internal space of the stator coil, a two-way switch electrically connected to the rotor coil, and a capacitor electrically connected to the two-way switch, and a controller electrically connected to the capacitor, the control method comprising:
- when a first differential calculus of acceleration of a load on the synchronous motor becomes negative, storing regenerative power regenerated in the rotor coil from the stator coil, in the capacitor through the two-way switch, by the controller, and
- supplying the regenerative power stored in the capacitor to the rotor coil through the two-way switch, by the controller.

* * * * *